United States Patent [19]
Yoon

[11] Patent Number: 5,833,852
[45] Date of Patent: Nov. 10, 1998

[54] SUPPLEMENTARY FILTER APPARATUS FOR A WATER PURIFIER

[75] Inventor: Deok-Joong Yoon, Suwon, Rep. of Korea

[73] Assignee: Samsung Electronics Co., Ltd., Suwon, Rep. of Korea

[21] Appl. No.: 803,148

[22] Filed: Feb. 19, 1997

[30] Foreign Application Priority Data

Feb. 28, 1996 [KR] Rep. of Korea .......................... 96-5111

[51] Int. Cl.⁶ .................................................. B01D 29/17
[52] U.S. Cl. .......................... 210/447; 210/448; 210/450; 210/451; 210/452; 210/454; 210/455; 210/497.01; 210/499
[58] Field of Search ..................................... 210/446, 447, 210/448, 451, 452, 450, 454, 455, 497.01, 499

[56] References Cited

U.S. PATENT DOCUMENTS

| | | | |
|---|---|---|---|
| 2,389,814 | 11/1945 | Pond et al. ............................... | 210/164 |
| 2,418,247 | 4/1947 | Dalzell .................................... | 210/164 |
| 2,545,789 | 3/1951 | Miller ...................................... | 210/164 |
| 4,505,816 | 3/1985 | Wozniak et al. ........................ | 210/446 |
| 4,654,141 | 3/1987 | Frentzel .................................. | 210/448 |
| 5,149,431 | 9/1992 | Coen ...................................... | 210/451 |
| 5,490,929 | 2/1996 | Yamamoto .............................. | 210/448 |
| 5,554,283 | 9/1996 | Brinda et al. ........................... | 210/451 |

*Primary Examiner*—W. L. Walker
*Attorney, Agent, or Firm*—Burns, Doane, Swecker & Mathis, L.L.P.

[57] ABSTRACT

A liquid filtering apparatus includes a hollow cylindrical accommodation member having external screw threads at respective ends. Connecting members are disposed at respective ones of those ends, and each connecting member possesses a passage to enable liquid to flow through the accommodation member. Each connecting member is adapted to be connected to a water pipe and is retained on the accommodation member by a respective lid member which is threaded onto a respective end of the accommodation member. A filter disposed inside of the accommodation member is in the form of a cylindrical perforated net and a panel extending across one end of the net to resist radial crushing of the net when the filter is removed and is being cleaned.

2 Claims, 3 Drawing Sheets

SUPPLEMENTARY FILTER APPARATUS FOR A WATER PURIFIER

BACKGROUND OF THE INVENTION

1. Field of the Invention

This invention relates to a supplementary filter apparatus for a water purifier that can prevent a pre-processing filter member from being clogged and thereby prolong the life of a membrane filter and a post-processing filter member.

2. Description of the Prior Art

As shown in FIG. 1, a conventional water purifier includes a pre-processing filter 3 installed at a rear part of a main body 1 for eliminating chloride elements and impurities contained in fresh water (tap water) supplied from a faucet 2 so as to remove various harmful organic materials as well as to protect a membrane filter (later described), a membrane filter 5 for removing various heavy metals and cancer-causing materials contained in the water which has passed through the pre-processing filter 3, a post-processing filter 7 installed at a side of the membrane filter 5 for eliminating noxious odor and harmful gas elements contained in the water which has passed the membrane filter 5, and a storage tank 9 installed at a front side of the main body 1 for storing the water which has been purified in the post-processing filter 7.

In FIG. 1, reference numeral 11 indicates a fresh water supply pipe for sending the fresh water from a faucet 2 to the pre-processing filter 3, reference numeral 13 indicates a purified water supplying pipe through which the water finally purified in the post-processing filter 7 is supplied to the storage tank 9, and reference numeral 15 indicates a discharging pipe through which the concentrated (waste) water not having passed through the membrane filter 5 is discharged.

In the conventional water purifier as constructed above, if a manual switch (not shown) is operated, the fresh water supplied from the faucet 2 passes through the fresh water supply pipe 11 and is filtered while passing through the pre-processing filter 3. The water pressure is raised by a compression pump (not shown), and the pressurized water passes through the membrane filter 5 and the post-processing filter 7 before being stored in the storage tank 9. The concentrated water which has not passed through the membrane filter 5 is discharged through the discharging pipe 15 formed at a lower side of the membrane filter 5.

However, there is a problem in the conventional water purifier, in that a lot of deposits and floating materials are included in the fresh water supplied from the faucet, so that they easily block the pre-processing filter 3, and they are attached to a filter surface of the membrane filter 5 to hinder a purifying function and to thereby further reduce the life of the post-processing filter 7.

Accordingly, in order to solve the above problems, as shown in FIG. 2, the water purifier according to the prior art is equipped with supplementary filter means 20 installed at the faucet 2 for eliminating in advance the sediment and floating materials contained in the fresh water to thereby prevent the pre-processing filter from being choked easily and to prolong the life of the membrane filter 5 and the post-processing filter 7.

The supplementary filter means 20 comprises an accommodation member 23 for accommodating a filtering net 21 therein and a lid member 25 coupled at an upper part of the accommodation member 23. An infuse hole 25a to which the fresh water is supplied from the water faucet 2 is formed at a top side of the lid member 25, and a discharging hole 23a through which the water filtered by the filtering net 21 is discharged is formed at a bottom side of the accommodation member 23.

The filtering net 21 has a cylindrical shape and is screwed into the accommodation member 23.

Connecting threads 23b and 25b are formed at the bottom end of the accommodation member 23 and the lid member 25, respectively, so as to be connected to the faucet 2 and other connecting members (not shown).

However, there is still another problem in the conventional water purifier in that it cannot be applied to a water source other than a water faucet because the supplementary filter member 20 must be connected to a water faucet 2. Also, the filtering net 21 is radially squeezed out of shape when being cleaned after its removal from the apparatus.

Further, there is still another problem in that the filtering net 21 has little elasticity, for the net is highly perforated. Also, the extent of contamination of the net by floating materials is difficult to be identified without disassembling the filter 20 because the accommodation member 23 is made of opaque materials.

Accordingly, it is an object of the present invention to provide a supplementary filter apparatus for a water purifier which can increase the utility of the supplementary filter means, prevent the filtering net from being crushed when being cleaned, and improve the elasticity of the net.

SUMMARY OF THE INVENTION

The above and other objects are achieved according to the invention of a supplementary filtering apparatus, the apparatus comprising:

filtering means molded to a panel member at an end thereof for crush-proofness and for increased elasticity;

accommodation means installed at an outer side of the filtering means in order to accommodate the filtering means;

connecting means installed at an upper end and a lower end of the accommodation means in order to facilitate connection of water pipes; and lid means screwed at the upper end and the lower end of the accommodation means in order to retain the connecting means to the upper end and the lower end of the accommodation means.

BRIEF DESCRIPTION OF THE DRAWINGS

For a fuller understanding of the nature and objects of the invention, reference should be made to the following detailed description taken in conjunction with the accompanying drawings in which.

DESCRIPTION OF THE PREFERRED EMBODIMENT

The preferred embodiment of the present invention will now be described in detail with reference to FIG. 3 of the accompanying drawings.

Figure 1:
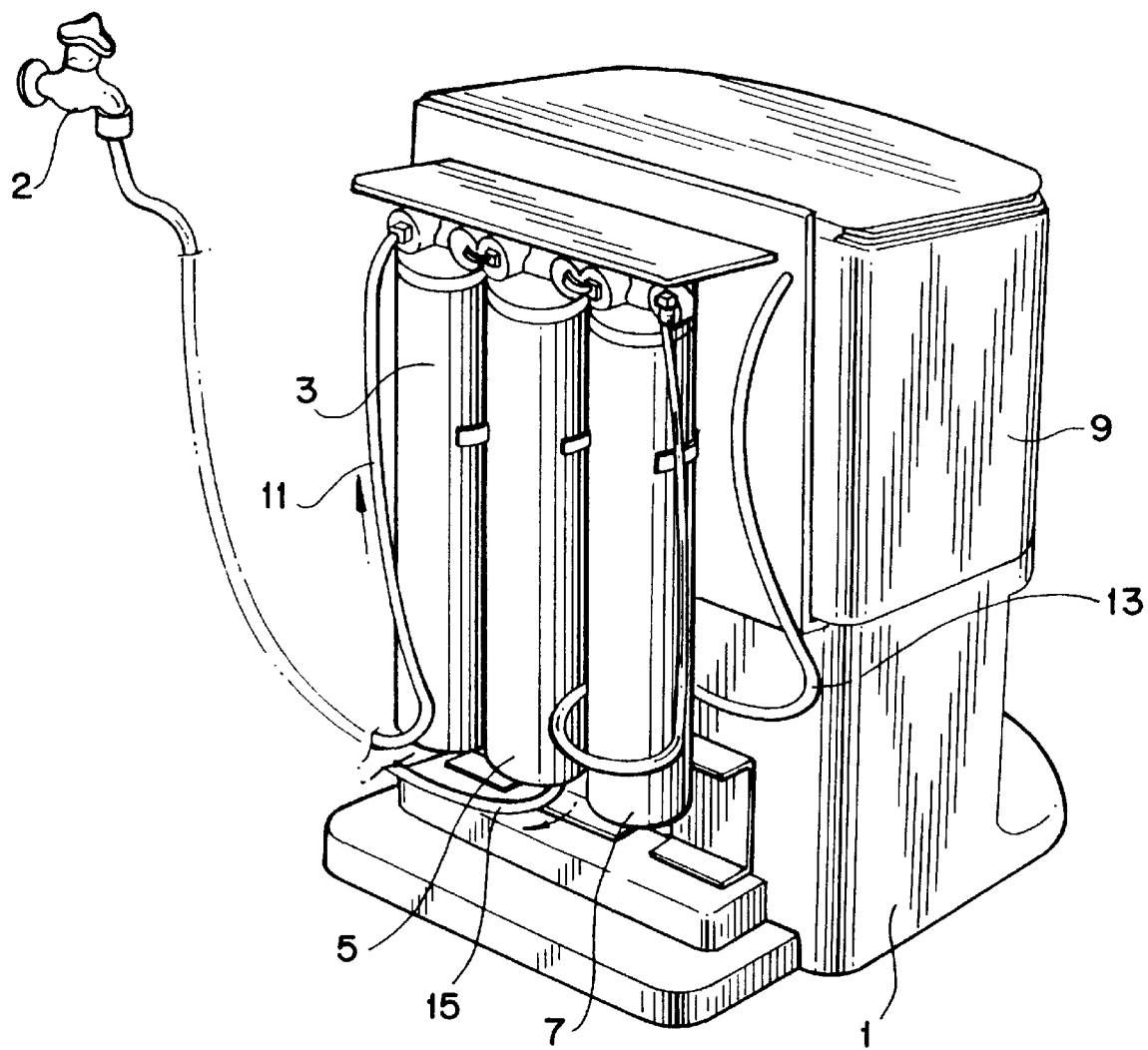
FIG. 1 is a perspective view for schematically illustrating a conventional water purifier.
Figure 2:
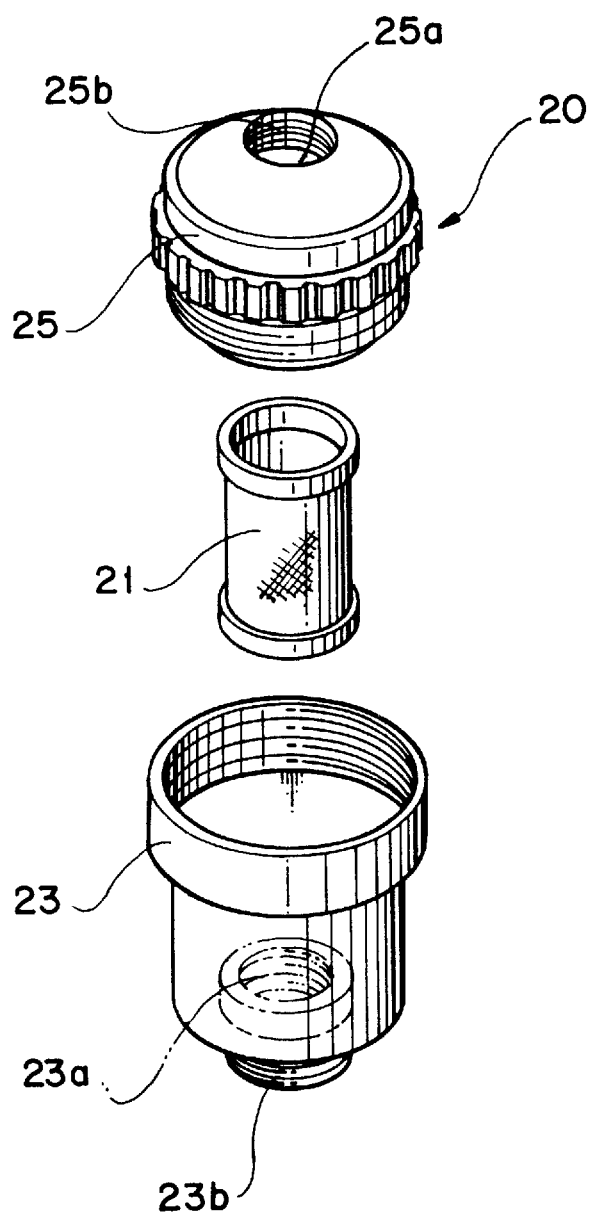
FIG. 2 is an exploded perspective view for schematically showing a conventional supplementary filter means of a water purifier.
Figure 3:
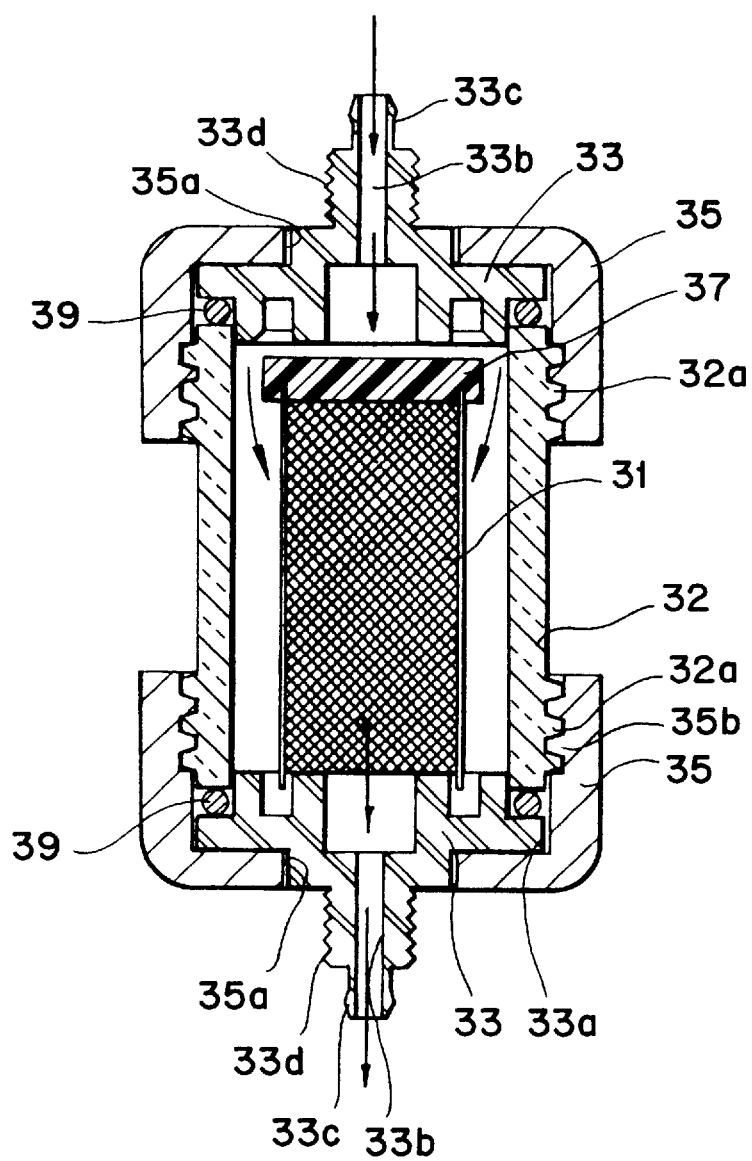
FIG. 3 is a longitudinal sectional view of a supplementary filter apparatus according to an embodiment of the present invention.

As shown in FIG. 3, a hollow, generally cylindrical accommodation means 32 accommodating a coaxial filtering means 31 in the form of a cylindrical perforated net is installed in a supplementary filter apparatus according to the present invention, and upper and lower connecting means 33 are installed, respectively, in the upper end and the lower end of the accommodation means 32 in order to facilitate connection of a water conducting pipe. Upper and lower lid means 35 are screwed to thread parts 32a formed at the upper end and the lower end of the accommodation means 32 outside of the two connecting means 33 for retaining the connecting means.

The filtering means 31 is provided at one end thereof with a plastic-molded panel member 37 in order to increase an elasticity of the filtering means 31 and to simultaneously decrease the crushability thereof during the cleaning thereof. The other end of the filtering means is mounted to the lower connecting means 33 which is disposed underneath the accommodation means 32. That is, such other end bears against an axially facing surface 33e of the connecting member 33.

Each connecting means 33 has a flange 33a for compressing a sealing means 39 against an end of the accommodation means 32 to thereby prevent leakage, and a through-hole 33b is formed at an inner center side of each connecting means 33 in order to form a fluid passage. A protrusion 33c is formed at an end of each connecting means for easy connection to a water-conducting pipe (not shown). A coupling part 33d on which a nut can be threaded is formed on an outer periphery of each protrusion so that the water pipe to be connected to the protrusion does not become dislodged.

Each lid means 35 has an opening 35a formed approximately at a center thereof through which the protrusion 33c and the coupling part 33d protrude, and a thread 35b is formed at an inner periphery thereof so as to be threaded to the thread part 32a of the accommodation means 32.

The accommodation means 32 is made of transparent flexible materials in order to make it easy to identify a deposit amount of floating materials.

In the supplementary filter apparatus assembled like explained above, the upper connecting means 33 becomes connected to the water pipe communicating with the water faucet.

Now, operational effects of the supplementary filter apparatus for a water purifier according to the present invention are described as follows:

Water supplied through a water pipe communicating with the water faucet enters the through-hole 33b of the upper connecting member 33 to thereby flow into the filtering member 31 from the outer surface thereof. At this time, materials larger than mesh size of the filtering member 31 are accumulated in the accommodation means 32, while the water having passed through the filtering member 31 flows out through the through-hole 33b of the lower connecting means 33. At this time, the upper and lower sealing means 39 compressed by the flange 33a of the respective connecting means 33 serves to prevent water leakage.

If a high contamination state of the filter 31 by deposited floating materials is identified by looking through the transparent accommodation means 32, the lower lid means 35 is unscrewed so that the lower connecting means 33 can be taken out, enabling the filtering member 31 to be removed and cleaned, and the floating materials deposited in the accommodation means 32 to be cleaned out.

At this time, the filtering member 31 is prevented from being radially crushed because one of its ends is moulded to the plate member 37 to thereby increase its elasticity when cleaned.

There is an advantage in the supplementary filter apparatus of the present invention as constructed above in that the utility of the supplementary filter means is increased by the use of connecting members, the elasticity of the filtering member is increased and its radial strength is increased. Also, the extent of and contamination of the filter can be easily identified by the fact that the accommodation means is made of transparent materials.

What is claimed is:

1. A liquid filtering apparatus comprising:

a hollow generally cylindrical accommodation member formed of a transparent material and having first and second externally screw-threaded ends;

a pair of substantially identically shaped connecting members disposed at respective ones of the ends of the accommodation member, a portion of each connecting member adapted to be connected to a liquid conducting pipe, and such portions having respective passages extending therethrough to define an inlet and outlet respectively, which enable liquid to flow through the accommodation member;

a pair of seal rings disposed between the accommodation member and respective ones of the connecting members:

a pair of substantially identically shaped lid members threaded to respective ones of the ends for retaining the connecting members on the accommodation member; and a filter comprised of a perforated generally cylindrical net disposed substantially coaxially within the accommodation member for filtering liquid flowing through the accommodation member, and a solid panel mounted across one end of the net disposed closest to the inlet and spaced from the inlet, for resisting a radial crushing of the net, an opposite end of the net being open and bearing against an axially facing surface of the connecting member whose passage defines the outlet, whereby liquid flows into the accommodation member through the inlet, around the outside of the solid panel and into the interior of the net, through the open end of the net and out of the accommodation member through the outlet.

2. The filtering apparatus according to claim 1 wherein the portion of each connecting member through which the passage extends is in the form of a protrusion having a screw thread formed on its outer periphery adapted to facilitate connection with a water conducting pipe.

* * * * *